US008804208B2

(12) United States Patent
Tanaka et al.

(10) Patent No.: US 8,804,208 B2
(45) Date of Patent: Aug. 12, 2014

(54) IMAGE READING APPARATUS

(75) Inventors: Satoshi Tanaka, Yamanashi (JP);
Yoshihiko Minagawa, Yamanashi (JP);
Hideaki Inoue, Yamanashi-ken (JP);
Junya Ozawa, Yamanashi-ken (JP);
Yoshihiro Hanagata, Yamanashi-ken (JP); Hotaka Ishimaru, Yamanashi-ken (JP)

(73) Assignee: Nisca Corporation, Minamikoma-gun, Yamanashi (JP)

( * ) Notice: Subject to any disclaimer, the term of this patent is extended or adjusted under 35 U.S.C. 154(b) by 35 days.

(21) Appl. No.: 13/638,335

(22) PCT Filed: Mar. 24, 2011

(86) PCT No.: PCT/JP2011/057228
§ 371 (c)(1),
(2), (4) Date: Sep. 28, 2012

(87) PCT Pub. No.: WO2011/135952
PCT Pub. Date: Nov. 3, 2011

(65) Prior Publication Data
US 2013/0010338 A1 Jan. 10, 2013

(30) Foreign Application Priority Data

Apr. 28, 2010 (JP) ................................. 2010-104376
Apr. 28, 2010 (JP) ................................. 2010-104377

(51) Int. Cl.
H04N 1/04 (2006.01)
H04N 1/40 (2006.01)
H04N 1/028 (2006.01)
H04N 1/401 (2006.01)
H04N 1/00 (2006.01)
H04N 1/48 (2006.01)
H04N 1/193 (2006.01)
H04N 1/03 (2006.01)
H04N 1/10 (2006.01)

(52) U.S. Cl.
CPC ...... H04N 1/00795 (2013.01); H04N 2201/044 (2013.01); H04N 1/193 (2013.01); H04N 1/0285 (2013.01); H04N 1/401 (2013.01); H04N 1/0303 (2013.01); H04N 1/00806 (2013.01); H04N 1/02845 (2013.01); H04N 1/48 (2013.01); H04N 1/0305 (2013.01); H04N 1/1017 (2013.01)
USPC ........... 358/475; 358/474; 358/461; 358/465; 358/509; 358/505

(58) Field of Classification Search
USPC ......... 358/475, 487, 474, 509, 506, 505, 461, 358/465; 399/220, 221; 250/234–236; 355/67–71
See application file for complete search history.

(56) References Cited

U.S. PATENT DOCUMENTS

2006/0215933 A1 9/2006 Nakaya et al.
2012/0307322 A1* 12/2012 Ozawa et al. ................. 358/475

FOREIGN PATENT DOCUMENTS

JP H10-065874 3/1998
JP 2000-123152 4/2000

(Continued)

Primary Examiner — Cheukfan Lee
(74) Attorney, Agent, or Firm — Manabu Kanesaka

(57) ABSTRACT

An image reading apparatus that reads images of document images having different gloss levels with a reproducibility suitable for uses includes a data processor to irradiate a document image with light from a regular reflection light source and a diffuse reflection light source, and to generate image data based on a regular reflection output value and a diffuse reflection output value obtained from a photoelectric converter.

18 Claims, 9 Drawing Sheets

(56) References Cited

FOREIGN PATENT DOCUMENTS

| | | |
|---|---|---|
| JP | 2004-274299 | 9/2004 |
| JP | 2006-126632 | 5/2006 |
| JP | 2006-261819 | 9/2006 |
| JP | 2006-279228 | 10/2006 |

* cited by examiner (a)

(b)

(a) REGULAR REFLECTION OUTPUT (b) DIFFUSE REFLECTION OUTPUT (c)

IMAGE READING APPARATUS

RELATED APPLICATIONS

The present application is National Phase of International Application No. PCT/JP2011/057228filed Mar. 24, 2011, and claims priority from Japanese Applications No. 2010-104377, filed Apr. 28, 2010; and No. 2010-104376, filed Apr. 28, 2010.

FIELD OF THE INVENTION

The present invention relates to an image reading apparatus for reading documents arranged on a platen or a document image running along the platen at a predetermined speed by a photoelectric conversion means, and relates to an accuracy enhancement of reading of a gloss image.

BACKGROUND ART

In general, this type of an image reading apparatus has been widely known as an apparatus in which a document image on a platen is irradiated with light, and its reflected light is read as an electric signal by a photoelectric conversion means. And each configuration of an apparatus for reading a document image arranged and set on a platen, and an apparatus for reading a document image moving on a platen at a predetermined speed has been known. As its reading optical system, a light path configuration with an optical system having the same magnification factor to guide a reflected light from the document image to a photoelectric conversion element, and a light path configuration with an optical system having a reduced magnification factor to guide it to a photoelectric conversion element have been known.

Conventionally, as such an apparatus, a monochrome image reading one or a color image reading one has been known. In case of the color, the photoelectric conversion element is configured by a color sensor, and in case of the monochrome, it is configured by a monochrome sensor. In either of these cases, when a gloss image is read, a problem arises in the accuracy of reading (contrast or the like) on a gloss region. That is, in case of a gloss image such as a photo image or a metallic print of gold or silver color print or the like, when a reading surface is irradiated with light from a conventional light source from an oblique direction, and then its diffuse reflection light is subjected to photoelectric conversion, then, the read data of an image of the gloss surface (region) is read as a dark data.

And so, for example, a patent document 1 (Japanese Laid-Open Patent Publication (Kokai) No. 2000-123152) has proposed a method in which a diffuse reflection light source for irradiating a document image with light from a direction declined by a predetermined angle with respect to the document image and a regular reflection light source for irradiating the document image with light from a vertical direction with respect to the document image are provided, and image data obtained by image reading using the light from the diffuse reflection light source and image data obtained by image reading using the light from the regular reflection light source are combined so as to obtain image data rich with reality such as texture, tone, or the like.

Also, a patent document 2 (Japanese Laid-Open Patent Publication No. 2006-126632) has proposed an apparatus in which a document image is irradiated with light from a declined direction and from a vertical direction with respect to the document image, and diffuse reflection light and regular reflected light are selectively guided to a photoelectric conversion means by switching between imaging paths for guiding the reflected light from the document image to the photoelectric conversion means.

And so, when one image data is to be obtained by photoelectric conversion data of each of the diffusion reflection light and the regular reflection light, conventionally, such as in the above-mentioned patent documents 1 and 2, a combining method is employed in which converted data from the diffuse reflection light and converted data from the regular reflection light are compared, and an output value (for example, data having a larger brightness) is determined to be the pixel data.

On the other hand, in such a type of an image reading apparatus, image data is obtained by correcting photoelectrically converted output value such as by shading correction, γ correction or the like for correcting distortion of image data due to time-dependent deterioration of a light source, deterioration of a photoelectric conversion element, or distortion of an imaging light path. In order to perform this shading correction, it has been known that a white reference plate is provided on a reading platen and a read-out output value (output value of a photoelectric conversion element) of a document image is corrected by its reference read-out value.

PRIOR ART DOCUMENT

Patent Document

PATENT DOCUMENT 1: Japanese Laid-Open Patent Publication (Kokai) No. 2000-123152
PATENT DOCUMENT 2: Japanese Laid-Open Patent Publication (Kokai) No. 2006-126632

SUMMARY OF THE INVENTION

Problems to be Solved by the Invention

As mentioned above, in order to obtain an image reading rich with reproducibility such as tone, texture, or the like of a document image, it is necessary to obtain read data in accordance with a gloss level of the document image. And so, the above-mentioned patent documents 1 and 2 have proposed a light source mechanism in which irradiating direction of the light from a light source is set in such a way that: regular reflection light from a document image is guided to a photoelectric conversion element, and the regular reflection read data is obtained; and diffuse reflection light from the document image is guided to the photoelectric conversion element, and the diffuse reflection read data is obtained.

Then, conventionally, the regular reflection read data and the diffuse reflection read data are compared and, for example, the data having a higher output value is determined to be a combined image data of the pixel. As such, by the comparison of the outputs of the read data, there is a problem in that the color of a character, for example, a black character, printed on a gloss image region is reproduced as a slightly gray character. In addition, there is a problem in that the tone of an image of a gloss image region is different from that of an actual document image.

Accordingly, the inventors of the present invention have ascertained the factors of the reproducibility of a character color or tone of a gloss region. As a result, with respect to a gloss pixel and a non-gloss pixel, conventionally, pixel data is obtained from data having a larger strength as a reference by simply comparing regular reflection read data and diffuse reflection read data. Therefore, it has become clear that, even when the document image has no gloss level (or low), if the intensity of the regular reflection light is larger due to the influence of the irradiating light source, it is reproduced as a gloss image, and conversely, even when the document image has a low gloss level, if the intensity of the diffuse reflection light is larger due to the influence of the irradiating light source, it is reproduced as a non-gloss image.

Such an error of reading the gloss level is caused because, from the stand point of the layout, it is difficult to arrange a regular reflection light source as a point (or linear) light source directly below an image reading surface in the vertical direction, and along with this, it becomes a pseudo-regular reflection light source due to the influence of a concave and convex or distortion of the surface of the document image. Similarly, the diffuse reflection light source becomes a pseudo-diffuse reflection light source due to the influence of a concave and convex or distortion of the surface of the document image. This problem of the light source is a cause of growing the problem in the reproducibility of the document image.

In order to solve such problems, the present inventors have reached to conceive that, when image data is to be obtained (combined) from regular reflection read data and diffuse reflection read data, whether the read pixel is a gloss pixel or a non-gloss pixel is determined with reference to threshold data. And this determining threshold is set in accordance with a light irradiation characteristic of the diffuse reflection light source and the regular reflection light source equipped with the apparatus, and the gloss level according to the specification of the apparatus, so that it becomes possible to reproduce a gloss image rich with tone and texture.

Further, the inventors of the present invention have prepared a reference surface having a gloss level adapted to, for example, DTP use, photo reading use, or the like, and by making the photoelectric conversion output value of this reference surface to be the determining threshold, it has become possible to reproduce a gloss image rich with tone and texture matched with the specification of the apparatus.

An object of the present invention is to provide an image reading apparatus capable to read images of documents having different gloss levels with a reproducibility suitable for uses.

Further, another object of the present invention is to provide an image reading apparatus of a simple structure capable to perform accurate shading correction of read data of a gloss pixel and a non-gloss pixel.

Means to Solve the Problems

To attain the above objects, the present invention is characterized in that a data processing means is provided to irradiate a document image with light from a regular reflection light source and a diffuse reflection light source, and to generate image data based on a regular reflection output value and a diffuse reflection output value obtained from a photoelectric converting means, this data processing means obtaining gloss pixel data by comparing, based on a regular reflection correction value for shading correction of the regular reflection output value, a diffuse correction output value for shading correction of the diffuse reflection output value, and a determining threshold for determining whether or not the regular reflection output value is a gloss pixel, the corrected output value corrected by the regular reflection correction value with the determining threshold, and obtaining a non-gloss pixel data from a corrected output value corrected by the diffuse correction value.

Thereby, when the determining threshold is set based on a reference surface having a gloss level suitable for a specification of an apparatus, pixel data of loss pixels is determined by this threshold, and pixel data of the remaining non-gloss pixels is determined by diffuse reading data, and by combining the respective pixel data, image data is obtained. Accordingly, contrary to the conventional art, a gloss pixel is not processed as a non-gloss image, and a non-gloss pixel is not processed as a gloss pixel.

The constitution will be described in more detail. There is provided an image reading apparatus for reading document images having different gloss levels, comprising: a platen (2) setting a document image; a regular reflection light source (9b) for photoelectric conversion of substantially regular reflection light from a document image; a diffuse light source (9a) for photoelectric conversion of substantially diffuse reflection light from the document image; a photoelectric conversion means (8) photoelectrically converting reflection light from the document image on the platen; a control means (30) executing regular reflection reading of the document image irradiated with light from the regular reflection light source, and diffuse reflection reading of the document image irradiated with light from the diffuse light source; and a data processing means (38) generating image data based on each output value of regular reflection and diffuse reflection from the photoelectric conversion means.

The data processing means is configures in such away that it obtains, based on: a regular reflection correction value for correcting a regular reflection output value from the photoelectric conversion means; a diffuse correction value for correcting a diffuse reflection output value from the photoelectric conversion means; and a determining threshold for determining whether or not the regular reflection output value is a gloss pixel; gloss pixel data (Sd1) based on the regular reflection correction value after comparing the regular reflection output value from the document image with the determining threshold; and non-gloss pixel data (Sd2) based on the diffuse correction value for the diffuse reflection output value of the document image.

In addition, the regular reflection correction value is set from the output value of the photoelectric conversion means when light is irradiated from the regular reflection light source to a predetermined high gloss level reference surface; the diffuse correction value is set from the output value of the photoelectric conversion means when light is irradiated from the diffuse reflection light source to a predetermined low gloss level reference surface; and the determining threshold is set from the output value of the photoelectric conversion means when light is irradiated from the regular reflection light source to the low gloss level reference surface.

And, for example, the above-mentioned high gloss level reference surface is a high gloss level pate (33) provided on the platen, and the low gloss level surface is a low gloss level plate (34) provided on the platen, so that a suitable correction values and a threshold are obtained at each image reading, or data processing is performed based on correction values and a threshold previously stored in the apparatus.

Effects of the Invention

According to the present invention, with respect to document images having different gloss levels, a regular reflection output value and a diffuse reflection output value are obtained from a photoelectric converting means, gloss pixel data is obtained by comparing the corrected output value obtained by performing a shading correction on the regular reflection output value and the determining threshold for determining whether or not the regular reflection output value is a gloss pixel, and non-gloss pixel data is obtained from the corrected output value obtained by correcting it by the diffuse correction value, and so, there are the flowing remarkable effects.

Since the gloss pixel data is obtained by determining whether or not the image read data is a gloss pixel by the use of the determining threshold suitable for intended use of the image read data, and remaining non-gloss pixel data is obtained from the diffuse reflection output value, contrary to the conventional art, it is not necessary to compare the regular reflection output value and the diffuse reflection output value for each pixel to obtain the pixel data so that it is not necessary to store both images once and compare them. Therefore, when the optimum processing is performed, it becomes possible to obtain an image by one sheet of a memory.

Further, according to the present invention, a high gloss level reference plate having a predetermined high gloss level and a low gloss level reference plate having a predetermined low gloss level are provided on, for example, a reading platen, and it is configured in such a way that it obtains a regular reflection correction value for performing a shading correction on the regular reflection output value by irradiating the reference plates with light from the regular reflection light source and the diffuse reflection light source, a diffuse reflection correction value for performing a shading correction on the diffuse reflection output value, and the determining threshold for determining whether or not it is a gloss pixel, thereby it becomes possible to obtain the image reading apparatus which has a simple structure and by which data correction of an image is easy.

MODE FOR CARRYING OUT THE INVENTION

Figure 1:
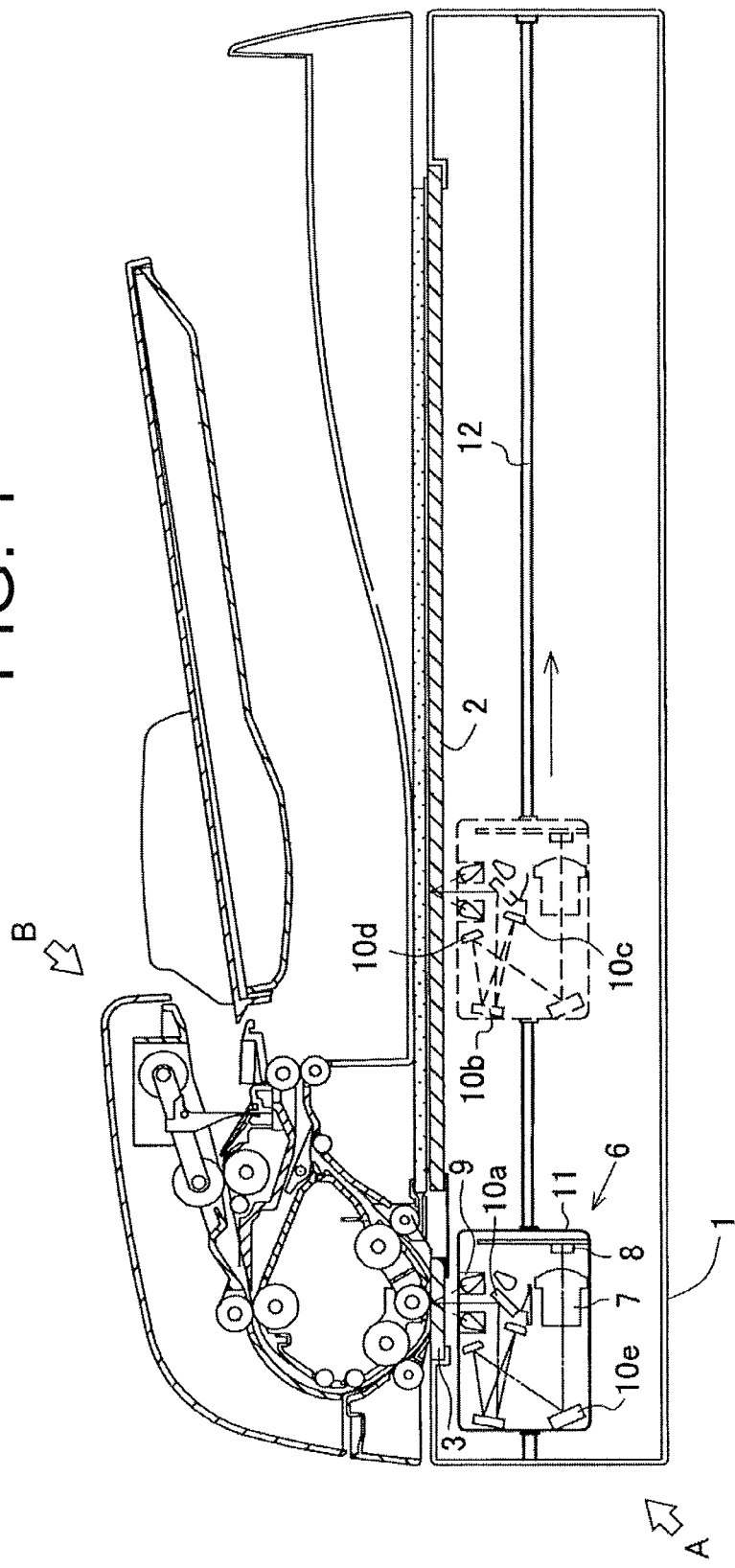
[FIG. 1] is an explanatory diagram of a whole constitution of an image reading apparatus.

In the following, the present invention will be described in detail based on illustrated preferred embodiments. FIG. 1 shows an image reading apparatus according to a first embodiment of the present invention. An image reading apparatus A is connected to a not shown image handling apparatus such as a computer, and to an image forming apparatus such as a system terminal or a printer for reading the document image and for transferring the data; reads the document image; and prints out the data.

The illustrated image reading apparatus A is provided with a platen 2 on a casing 1, and an optical carriage 6 is installed in such a way that it is free to reciprocate along the platen 2. A light source 9 for irradiating reading light on a document image Ga on the platen 2, a photoelectric sensor for photoelectrically converting the reflected light from the document image Ga, a reflecting mirrors 10 for guiding the reflected light to this sensor, and a condenser lens 7 are built into this optical carriage 6.

Alternatively, in the optical carriage 6, the light source 9 and the reflecting mirrors 10 may be mounted, and the condenser lens 7 and the photoelectric sensor 8 may be arranged on a chassis arranged for example on the bottom portion of the casing 1. In addition, the illustrated optical carriage 6 is a reading mechanism having an optical reduction system as an example; however, it may be a reading mechanism having the same magnification optical system (contact type).

The apparatus shown in FIG. 1 is provided with, other than the flat-bed type platen 2, a platen 3 of a slit exposure-type. On the flat-bed type platen 2, a document sheet is mounted and set in a resting state, while on the slit exposure type platen 3, the document sheet is set to run at a predetermined speed. The platen in the present invention may be either of the configurations of the flat-bed type platen and the slit exposure type platen, or as illustrated in the figure, may be configured by the both platens. On the slit exposure type platen 3, a feeding apparatus B is arranged to feed the document sheet to a reading portion. In the following, the present invention will be explained for the constitution of the flat-bed type platen 2.

Figure 2:
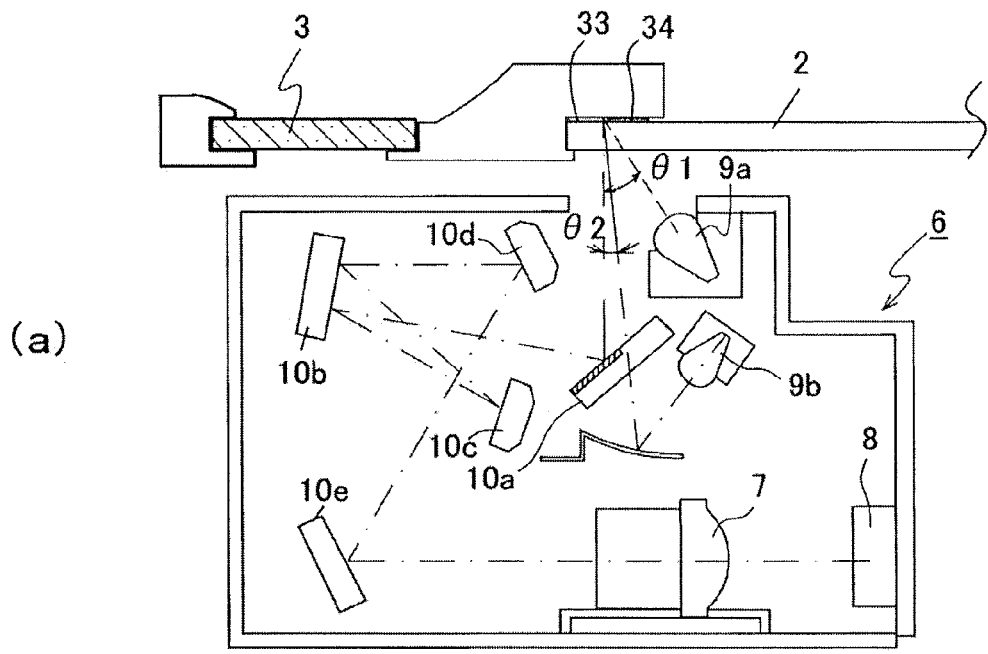
[FIG. 2] is an explanatory diagram of a main section of the image reading apparatus shown in FIG. 1, wherein (*a*) shows irradiating states of light sources, and (*b*) shows a configuration diagram of an arrangement of reference plates.
Figure 2:
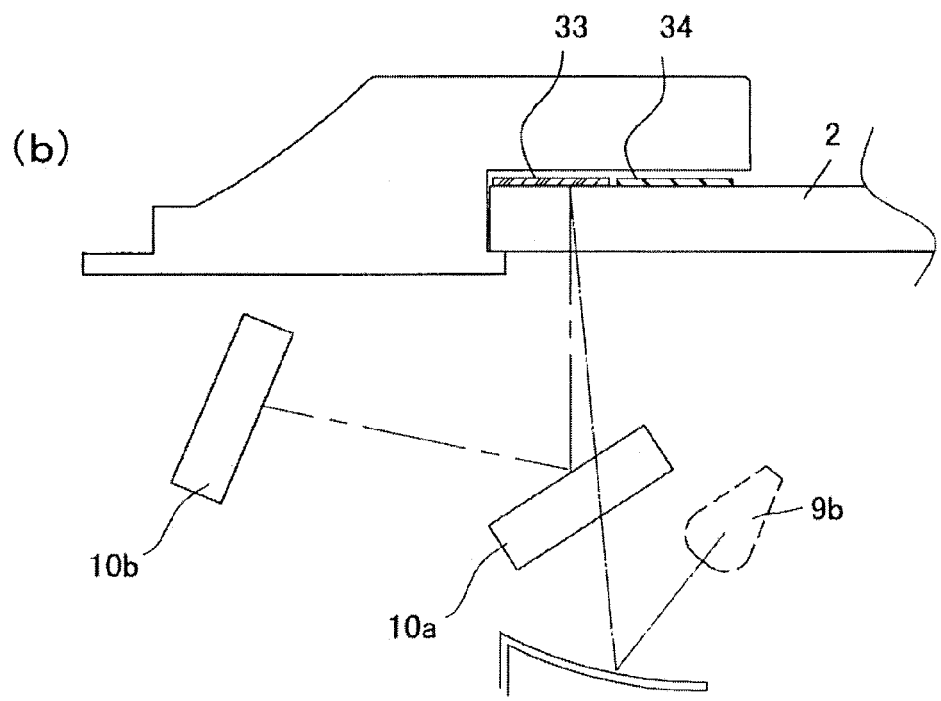

In the above-mentioned optical carriage (hereinafter referred to as "carriage") 6, a first light source 9*a* and a second light source 9*b* are mounted as shown in FIG. 2. This first light source 9*a* irradiates light on a reading portion R of the flat-bed type platen 2 from a diagonal direction with an angle θ1. Also, the second light source 9*b* irradiates light on the reading portion R from substantially vertical direction directly below with an angle θ2 (θ2<θ1). And a light path is formed in such a way that the reflection light from the document image Ga is guided through a first mirror 10*a*, a second mirror 10*b*, a third mirror 10*c*, a fourth mirror 10*d*, and a second mirror 10*e*, to the condenser lens 7, and from the condenser lens 7 to form an image on the photoelectric sensor 8.

As such, the first light source 9*a* irradiates light on the reading portion R from a diagonal direction with an angle θ1, and diffuse reflection light from the image surface is output to the photoelectric sensor 8. Further, the second light source 9*b* irradiates light on the reading portion R from substantially vertical direction directly below, and the regular reflection light from the image surface is output to the photoelectric sensor 8.

That is, the reflection light from the first light source 9*a* (almost all of the components is the diffuse reflection light) is substantially the diffuse reflection light, and the diffuse reflection light is subjected to the photoelectric conversion; and substantially regular reflection light from the second light source 9*b* is subjected to the photoelectric conversion. Thus, the following, the first light source 9*a* is referred to as a diffuse reflection light source; the second light source 9*b* is referred to as a regular reflection light source; the output value of the photoelectric sensor 8 from the first light source 9*a* is referred to as a diffuse reflection output value; and the output value of the photoelectric sensor 8 from the second light source 9*b* is referred to as a regular reflection output value.

Note that the above-mentioned photoelectric sensor 8 is configured of a color line sensor having a sensor array with photoelectric conversion elements arranged in a line state in a main scanning direction (a direction from front to back in FIG. 1). The illustrated one is configured of a CCD line sensor. Further, the first light source 9a and the second light source 9b are also configured of line-type rod-shaped lamps.

The carriage 6 is configured to be able to reciprocate in a sub-scanning direction (the horizontal direction in FIG. 1) along a guide rail 12 so as to reciprocate by a not-shown carriage motor. Accordingly, the carriage 6 reads an image in linear sequence, while moving in the sub-scanning direction along the flat-bed type platen 2.

Figure 3:
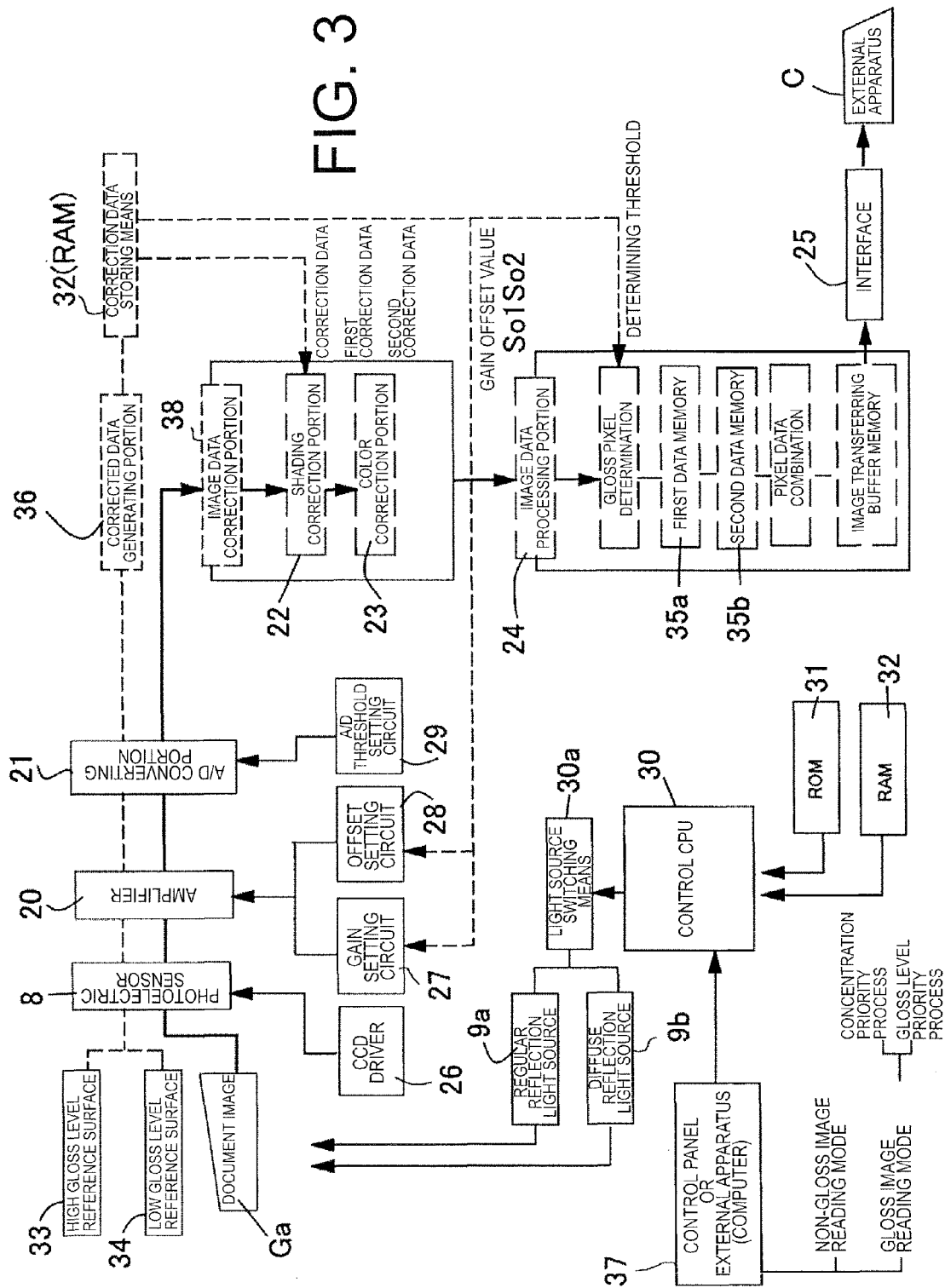
[FIG. 3] is a processing circuit of image data output from a photoelectric sensor.

The configuration of the image processing in the image reading apparatus A constituted as described above will be explained. FIG. 3 shows a processing circuit of the image data output from the photoelectric sensor 8. A signal (analog) output from the photoelectric sensor 8 passes through an amplifier 20 and an A/D converting portion 21 to be sent from a shading correction portion 22 and a color correction portion 23 to an image data processing portion 24, and is transferred from an external interface 25 to an external apparatus C. Apart from this, it is configured in such a way that the output signal from the photoelectric sensor 8 passes through the amplifier 20 and the A/D converting portion 21 to be sent to a correction data generating portion 36, and the corrected data is stored in a storing means (RAM) 32.

The above-mentioned photoelectric sensor 8 (the illustrated one is a CCD) is connected to a CCD driver 26 to generate timing for controlling the sensor output. This photoelectric sensor 8 reads, as described later, image data and reference plates (a high gloss level reference surface 33 and a low gloss level reference surface 34 as later described). The above-mentioned amplifier 20 is connected to a gain setting circuit 27 and an offset setting circuit 28. Further, the A/D converting portion 21 is connected to an A/D threshold setting circuit 29 for setting a reference threshold for the A/D conversion.

On the other hand, image reading by the above-mentioned photoelectric sensor 8 is controlled by a control CPU 30, and this CPU is configured in such a way that it performs the "reference data reading" and the "image reading" in accordance with a control program prepared in the ROM 31 and control data prepared in the RAM 32. The "reference data reading" is a reading of the high gloss level reference surface 33 and the low gloss level reference surface 34 prepared on the flat-bed type platen 2, and the "image reading" is a reading of the document image Ga set on the flat-bed type platen 2.

The above-mentioned amplifier 20 amplifies an image signal output from the photoelectric sensor 8. To this end, the gain setting circuit 27 and the offset setting circuit 28 are provided. In this case, gain values and offset values are previously set as those for "diffuse reflection output value" and "regular reflection output value" respectively in accordance with the later described method, and are stored in the storing means (ROM) 32.

The above-mentioned A/D converting portion 21 converts an output value (analog value) from the photoelectric sensor 8 into a digital value. This A/D converting portion converts the analog output value into the digital signal by an A/D converter. By this A/D conversion, it is converted into a predetermined concentration gradation of, for example, 256 gradation, 128 gradation, or binarized digital signal.

The above-mentioned shading correction portion 22 corrects the output signal digitalized by the A/D converter. It corrects the light amount fluctuations in the line direction (main scanning direction) of the previously-described light sources 9a and 9b, fluctuation of the photoelectric sensor 8, or unevenness of brightness of the output value due to fluctuation of the image taking optical system (the reflecting mirrors 10, the condenser lens 7, etc). This shading correction data is obtained in accordance with the later described method and is stored in the storing means (ROM) 32.

The above-mentioned color correction portion 23 corrects the output value digitalized by the A/D converter. The output value is subjected to gamma correction, noise cancelling, or the like.

The above-mentioned image data processing portion 24 performs a preprocessing by transferring the image data, which has been subjected to the A/D conversion, shading correction, color correction, or the like, to the external. In the illustrated apparatus, the above-described "diffuse reflection output value" and the "regular reflection output value" are combined to obtain the image data. This method will be described later.

In such a configuration, the illustrated apparatus includes the control CPU 30 in which an executing program is configured to execute, with respect to the "image reading", a diffuse reflection reading for irradiating light from the first light source (diffuse reflection light source) 9a and for photoelectrically converting the diffuse reflection light by the photoelectric sensor 8, and a regular reflection reading for irradiating light from the second light source (regular reflection light source) 9b and for photoelectrically converting the regular reflection light by the photoelectric sensor 8.

Then, from a document image with a low gloss level (hereinafter referred to as "non-gloss image"), image data is obtained by the diffuse reflection reading (a non-gloss image reading mode), and from the other document image (hereinafter referred to as "gloss image"), image data is obtained by performing the regular reflection reading and the diffuse reflection reading (a gloss image reading mode).

That is, with respect to a non-gloss image, light is irradiated from the first light source 9a to the document image Ga on the platen, and the reflection light is photoelectrically converted by the photoelectric sensor 8, and with respect to a gloss image, light is irradiated from the second light source 9b to the document image Ga on the platen. At this time, if a part of the document image Ga is a gloss image (a document image with a different gloss level), gloss pixel data and non-gloss pixel data from the sensor outputs of the regular reflection reading and the diffuse reflection reading are combined.

Note that the illustrated apparatus is configured in such a way that, when the gloss image reading mode is selected, the regular reflection reading and the diffuse reflection reading are performed on the same image, and one image data is obtained from the output values of both sensors.

Accordingly, when the whole of the document image Ga is a gloss image, image data is obtained from the regular reflection reading data only as a result.

And so, in the control CPU 30, a mode setting is performed by an input means (a control panel) 37 for an image reading mode (the non-gloss image reading mode or the gloss image reading mode). Along with this, the control CPU 30 is connected to a light source switching means 30a for switching between the first light source 9a and the second light source 9b in accordance with the set mode.

Specifically, the control CPU 30 generates "ON" or "OFF" command and a light amount adjusting command to control a power supply circuit (not shown) of the first and the second light sources 9a and 9b.

The present invention is characterized in the "correction data generation" and the "image combining" in the above-described image reading apparatus.

[Correction Data Generating Portion]

As shown in FIG. 3, the output value of the photoelectric sensor 8 is sent through amplifier 20 and the A/D converting portion 21 to the correction data generating portion 36. In this correction data generating portion 36, the "shading correction data" and the "determining threshold" are set. The shading correction data generates correction data of the previously described shading correction portion 22, and the determining threshold generates a reference value for determining whether it is a gloss pixel or a non-gloss pixel. And the generated "values" are stored in the correction data storing means (RAM) 32.

To this end, the above-mentioned flat-bed type platen 2 is provided with the reference plates 33 and 34 as shown in FIG. 2(b). The reference plates 33 and 34 are arranged on regions outside of the image reading region of the flat-bed type platen 2. And the first reference plate is formed as the high gloss level reference surface 33 and the second reference plate is formed as the low gloss level reference surface 34.

When light (the illustrated one is LED light) is irradiated from the above-mentioned second light source (regular reflection light source) 9b to the high gloss level reference surface 33 and the low gloss level reference surface 34, the gloss level of the high gloss level reference surface 33 is set to be [α%], and the gloss level of the low gloss level reference surface 34 is set to be [β%]. This [α%] is set to be the maximum gloss level of the document image Ga, and the [β%] is set to be the minimum gloss level of the document image Ga in accordance with the specification of the apparatus.

For example, when the maximum gloss level of the document image Ga for image reading is a metallic print of gold, silver, or metallic color, the [α%] is set to be its gloss level, and when the maximum gloss level of the document image Ga for image reading is a photo print, the [α%] is set to be its gloss level. Also, when the minimum gloss level of the document image Ga for image reading is a normal paper monochromatic print, the [β%] is set to be its gloss level.

As such, the high gloss level reference surface 33 and the low gloss level reference surface 34 are set to be the maximum gloss level image and the minimum gloss level image in accordance with conditions such as texture and tone, and usage of the obtained image data, for example, design use or document use. The illustrated reference plates are set to be the high gloss level reference surface 33 and the low gloss level reference surface 34 by a white reference surface. By configuring the low gloss level reference surface (virtual) by the white reference surface as mentioned above, a white reference value at the time of the "diffuse reflection reading" can be obtained.

And so, image readings of the high gloss level reference surface 33 and the low gloss level reference surface 34 is performed by the photoelectric sensor 8 mounted in the optical carriage 6. According to the present invention, the image readings of the first and the second reference plates 33 and 34 are performed as follows. (1) By the light from the diffuse reflection light source 9a (the first light source 9a is turned off and the second light source 9b is turned on), the regular reflection light from the reference surfaces 33 and 34 is subjected to be photoelectric conversion.

Figure 4:
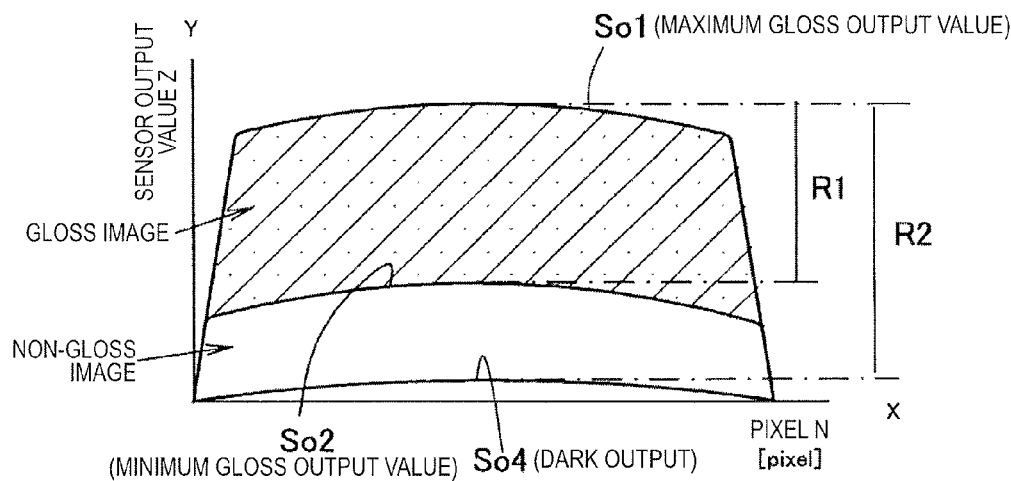
[FIG. 4] is an explanatory diagram of a correction circuit in the data processing portion in FIG. 3, wherein (*a*) shows a regular reflection light output, (*b*) shows a diffuse reflection output, and (*c*) shows a conceptual diagram of a determining circuit of gloss pixel data.
Figure 4:
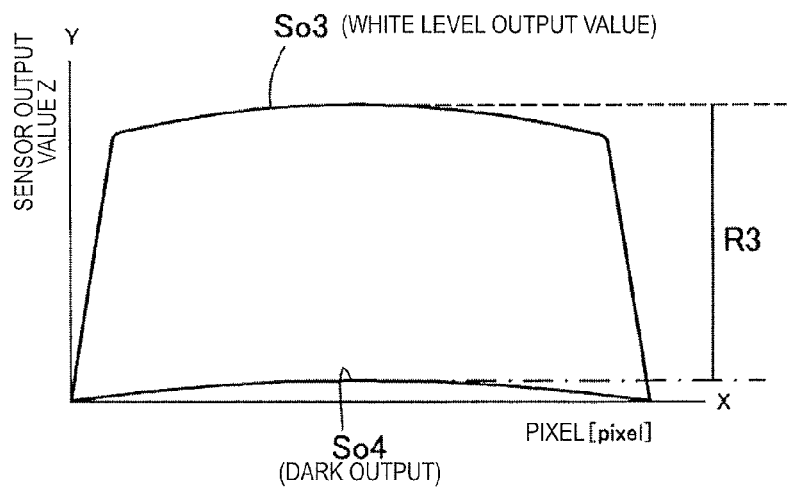
Figure 4:
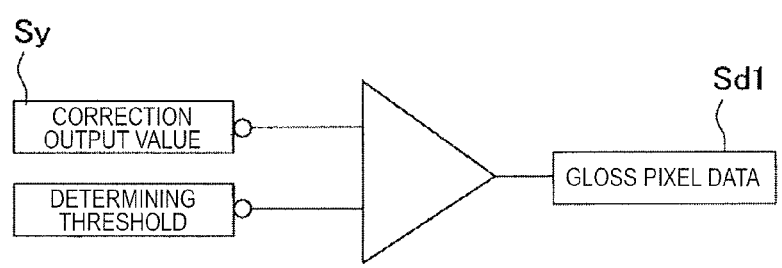

Because of this, the photoelectric sensor 8 outputs the maximum gloss level output value So1 from the high gloss level reference surface 33 and the minimum gloss level output value So2 from the low gloss level reference surface 34 as shown in FIG. 4(a). In the figure, X axis direction represents pixels N in the main scanning direction of the photoelectric sensor 8, and Y axis direction represents the output value Z of the sensor. In the figure, an example of the sensor output values Z are shown in which, for example, both end portions of the pixels N are appeared as unevenness of the light source brightness, and the brightness unevenness (not shown) in bits of the photoelectric sensor 8 appears for each pixel.

Then, (2) by the light from the diffuse reflection light source 9a (the first light source 9a is turned on and the second light source 9b is turned off), the diffuse reflection light from the low gloss level reference surface 34 is subjected to be photoelectric conversion. Thereby, the photoelectric sensor 8 outputs the white level output value So3 from the low gloss level reference surface 34 as shown in FIG. 4(b). And, (3) in a state where both of the first and the second light sources 9a and 9b are turned off, dark output value So4 of the photoelectric sensor 8 is obtained.

Note that, in the present invention, the white level output value So3 is obtained by photoelectrically converting the diffuse reflection light from the low gloss level reference surface 34 by the use of the light from the diffuse reflection light source 9a as described above, however, other than this, it may also be possible to determine the white level reference value as the minimum gloss level output value So2 obtained by the light from the regular reflection light source 9b, and therefore, there is not a so much difference in the correction of the brightness unevenness of the light source, or brightness unevenness of the photoelectric sensor among the cases when the later described white level output value So3 is obtained by the diffuse reflection reading and by the regular reflection reading.

Accordingly, when the reference output values So1, So2 and So3 are obtained by the reference surface reading of the above-mentioned (1) and (3), the preparation of the correction data can be performed in a short time so that the processing steps are easy, and when the reference output values are obtained by the reference surface reading of the above-mentioned (1), (2) and (3), more accurate correction data can be prepared.

Based on the thus obtained reference values, i.e., gain value setting reference data So1 (maximum gloss level output value), the determining threshold setting reference data So2 (minimum gloss level output value), the white reference data So3 (white level output value), and the black reference data So4 (dark output value), the "regular reflection reading shading correction value", the "diffuse reflection reading shading correction value" and the "gloss pixel determining threshold" are set.

At first, with respect to the regular reflection reading shading correction value, the illustrated apparatus is constituted in such a way that, in order to perform the "shading correction of the regular reflection output value", a first correction data and a second correction data are generated. This is because, when the repeatability of a gloss level of a gloss document is necessary, the following first correction data is set, and when the repeatability of a concentration gradation of an image is necessary, the following second correction data is set in accordance with a mode selection of a user.

The above-mentioned first correction data is normalized to have a predetermined concentration gradation within a range R1 shown in FIG. 4(a) between the maximum gloss level output value So1 and the minimum gloss level output value So2. That is, the maximum output value So1 shown in FIG. 4(a) is normalized to be a predetermined concentration gradation, for example 256 gradation. This normalized data is stored in a memory table in the storing means (RAM) 32 as RGB data for each bit of the photoelectric sensor 8. Also, the second correction data is normalized to have a predetermined concentration gradation within a range R2 shown in FIG. 4(a)

between the maximum gloss level output value So1 and the dark output value So4, and is stored in the memory table.

As such, as shown in FIG. 4(a), the data widths of the range R1 and the range R2 have a relation "range R1<range R2", and the first correction data is normalized within the data width of only the gloss image region so that the output correction is rich with repeatability of the gloss image quality. Also, the second correction data is normalized in the normal image (non-gloss image region) and the gloss image region, so that the output correction is rich with repeatability of the concentration gradation.

Specifically, when the correction is performed by the first correction data, a gloss image quality can be obtained with a high accuracy, however, a black character for example becomes a gray image quality, while when the correction is performed by the second correction data, the concentration gradation can be obtained with a high accuracy, however, black dot defects may appear in, for example, a gold or silver metallic printing region.

Next, the diffuse reflection reading shading correction value is normalized to have a predetermined concentration gradation within a range R3 shown in FIG. 4(b) between the white level output value So3 and the dark output value So4, and is stored in the memory table.

Based on such a shading correction data, the output value of the photoelectric sensor 8 during executing the image reading is subjected to a flat correction by the use of the shading correction data. That is, the reading error (unevenness of the brightness) of the obtained sensor output value is corrected by the correction data. This shading correction is performed after amplifying the output value of the photoelectric sensor 8 which has read the image, and converting the amplified value to a digital value by the A/D converting portion 21.

With respect to the maximum gloss output value So1 and the minimum gloss output value So2 obtained as described above, when the output value from the photoelectric sensor during executing the regular reflection reading is amplified by the amplifier 20, the gain value in the gain setting circuit 27 is set to be the maximum gloss output value So1, and the offset value in the offset setting circuit 28 is set to be the minimum gloss output value So2. In this way, the gloss level region can be reproduced with a high gradation.

[Image Combining]

The present invention is characterized in that "whether it is a gloss pixel or not" is determined with reference to the minimum gloss level output value So2 obtained by the above-described method. To this end, as described above, the flatbed type platen 2 is provided with the low gloss level reference surface 34 and the reflected light from the second light source 9b is subjected to the photoelectric conversion by the photoelectric sensor 8 and is stored as the determining threshold in the storing means (RAM) 32.

Then, the image data correction portion 38 corrects the output value from the photoelectric sensor 8 when the document image Ga is irradiated with light from the regular reflection light source (second light source) 9b, and then the image data processing portion 24 compares this corrected output value Sy with the determining threshold. By this comparison, if the corrected output value Sy is larger than the determining threshold, it is determined as gloss pixel data Sd1.

The comparing circuit in this case is a comparator as shown in FIG. 4(c) to compare the corrected output value Sy with the determining threshold so as to discriminate whether it is a gloss pixel or not based on the compared result. Then, the gloss pixel data Sd1 is stored at the corresponding address of a first memory 35a of a buffer memory 35 for example.

Along with this, the output value from the photoelectric sensor 8 when the document image Ga is irradiated with light from the diffuse reflection light source (first light source) 9a is corrected, and then the image data processing portion 24 stores the corrected output value Sy as non-gloss pixel data Sd2 at the corresponding address of the second memory 25b of the buffer memory 35 for example.

Then, the image data processing portion 24 reads the non-gloss pixel data Sd2 obtained by the diffuse reflection reading from the second memory 25b and the gloss pixel data Sd1 obtained by the regular reflection reading from the first memory 25a, and combines both data. If, for example, the gloss pixel data Sd1 is present at the same address of the non-gloss pixel data Sd2, this image combining is performed by replacing the pixel with the gloss pixel data Sd1.

In this way, image data of all addresses is obtained by combining the non-gloss pixel data Sd2 and the gloss-pixel data Sd1, where whether it is a gloss pixel or not is determined by comparing the corrected output value Sy obtained by the regular reflection reading with the determining threshold.

As such, the present invention is characterized in that the low gloss level reference surface 34 is set to have a gloss level corresponding to the use of the image data, and the output value So2 of the photoelectric sensor 8 obtained by reading this reference surface by the regular reflection reading (minimum gloss level output value) is made to be the determining threshold. In this way, image data can be output with a gloss reproducibility suitable for the purpose of use.

[Image Reading Operation]

Figure 5:
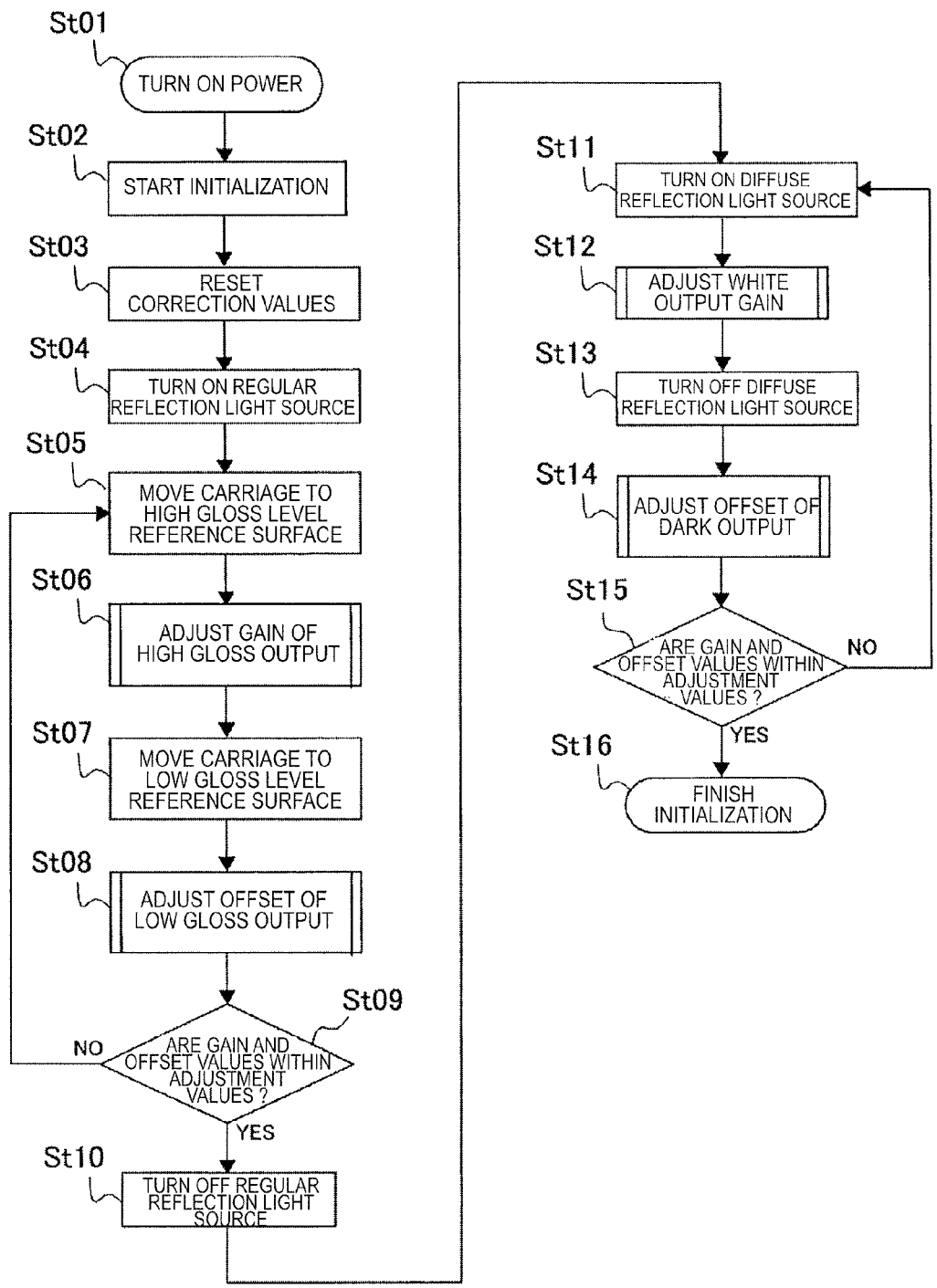
[FIG. 5] is a flowchart showing an initializing operation of the apparatus shown in FIG. 1.

Next, an image reading operation in the above-mentioned apparatus will be explained with reference to FIG. 5. FIG. 5 shows an initializing operation of the apparatus. When a power supply of the apparatus is turned on (St01), the initializing operation starts (St02). By this start of the initialization, the optical carriage 6 is moved to a predetermined home position and the set values in each circuit (a gain value, an offset value, and various correction values) are reset to their default values (St03).

Then, the control CPU 30 turns on the regular reflection light source 9b (St04) and moves the carriage 6 to a position to read the high gloss level reference surface 33 (St05). Then with reference to the output value of the photoelectric sensor for the high gloss level reference surface 33, a gain adjustment for the high gloss side is performed (St06). Next, the carriage 6 is moved to a position to read the low gloss level reference surface 34 (ST07) or remain where it is, the lamp is turned off and an offset adjustment for the low gloss side is performed (St08).

Next, the control CPU 30 judges whether or not the gain value and the offset value are within predetermined default values (St09). When it is judged to be "NO", the gain and offset adjustments are repeated (St05-St08).

Next, the control CPU 30 turns off the regular reflection light source 9b (St10) and turns-on the diffuse reflection light source 9 (St11). And the carriage 6 is moved to a position to read the low gloss level reference surface (white reference surface) 34 to perform a gain adjustment (St12). Then, in a state where the diffuse reflection light source 9a is turned off (St13), an offset adjustment is performed based on the dark output value So4 of the photoelectric sensor 8 (St14), and it is judged whether or not the gain and offset values are within predetermined default values (St15). When it is judged to be "NO", the gain and offset adjustments are repeated (St11-St14), and when it is judged to be "YES", the control CPU 30 finishes the initializing operation (St16).

Figure 6A:
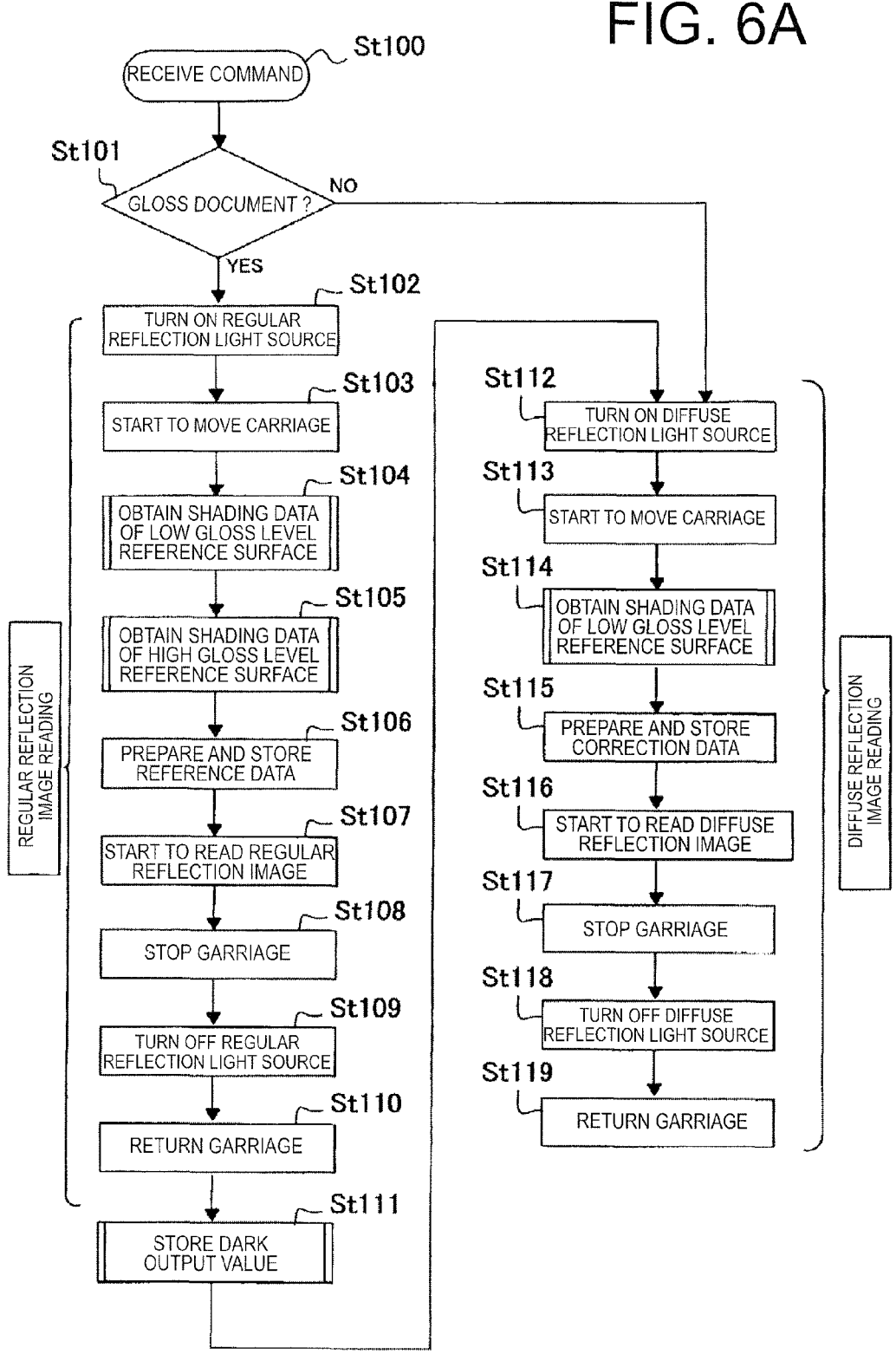
[FIG. 6A] is a flowchart showing an executing procedure of an image reading operation according to the present invention (first embodiment).

Next, the executing procedure of the image reading operation (first embodiment) will be explained with reference to FIG. 6A. To this end, the control CPU 30 receives an input signal from the control panel 37 or a command signal from a not shown image handling apparatus such as a computer. These input signal and the command signal are image reading conditions (color or monochrome, resolution, magnification factor, etc.) and a setting signal of the reading mode for the "gloss image reading" or the "non-gloss image reading" (St100). In this case, when the "gloss image reading" is selected, a condition of finishing as to whether it is "concentration priority finishing" or "gloss priority finishing" is received simultaneously.

In the above reading condition, when the "gloss image reading" is selected (when "YES" at St101), the process transits to the following operation, and when the "non-gloss image reading" is selected (when "NO" at St101), the later described steps St112-St119 are executed.

When the "gloss image reading" mode is carried out, the second light source (regular reflection light source) 9b is turned on (St102) and the carriage 6 is moved to the position of the low gloss level reference surface 34 (St103). Then, at this position, the output value So2 of the low gloss level reference surface 34 is obtained from the photoelectric sensor 8 (St104). Next, the carriage 6 is moved to the high gloss level reference surface 33 to obtain the output value So1 of the high gloss level reference surface 33 (St105).

The thus obtained maximum gloss output value So1 and the minimum gloss output value So2, and the dark output value So4 (obtained and stored at the later described step Still) of the photoelectric sensor 8 already obtained and stored in the RAM 32 are used to prepare the previously described first correction data and the second correction data and store them in the storing means (RAM) 32. Along with this, the determining threshold set with reference to the minimum gloss output value So2 is stored in the RAM 32 (st106).

Next, in a state where the second light source (regular reflection light source) 9b is turned on, the control CPU 30 reads the document image Ga on the flat-bed type platen 2 (St107). This data obtained by the regular reflection reading is stored in the buffer memory 35, digitized by the above-described amplifier 20 and the A/D converting portion 21, and shading correction and color correction are performed by an image data correcting portion 38 in parallel with the image reading. And the corrected output value Sy is compared with the determining threshold and is stored in the first memory 35a.

In this regular reflection reading (St107), when the reading of the whole of the document image is finished, the control CPU 30 stops the carriage 6 (St108), and turns off the second light source (regular reflection light source) 9b (St109). Along with this, the carriage 6 is returned back to the reading start position (St110). During this returning back process, the output value of the photoelectric sensor 8 is obtained and is stored as the dark output value So4 in the RAM 32 (St111).

Next, the control CPU 30 turns on the first light source (diffuse reflection light source) 9a (St112), and moves the carriage 6 to the reading position of the low gloss level reference surface 34 (St113). Then, from the output value of the low gloss level reference surface 34, the white level output value So3 is obtained (St114). This data generates the shading correction data in the similar way as mentioned before, which is stored in the memory table of the storing means (RAM) 32 (St115).

Next, the control CPU 30 moves the carriage 6 to the read starting position to execute the diffuse reflection reading (St116). This obtained data is digitized by the amplifier 20 and the A/D converting portion 21 in the same way as previously described; is subjected to shading correction and color correction by the image data correcting portion 38; and then is stored it in the second memory 35b.

After this, the control CPU 30 stops the carriage 6 (St117) and turns off the first light source (diffuse reflection light source) (St118). Then, the carriage 6 is returned back to the initial position (home position) (St119).

Figure 6B:
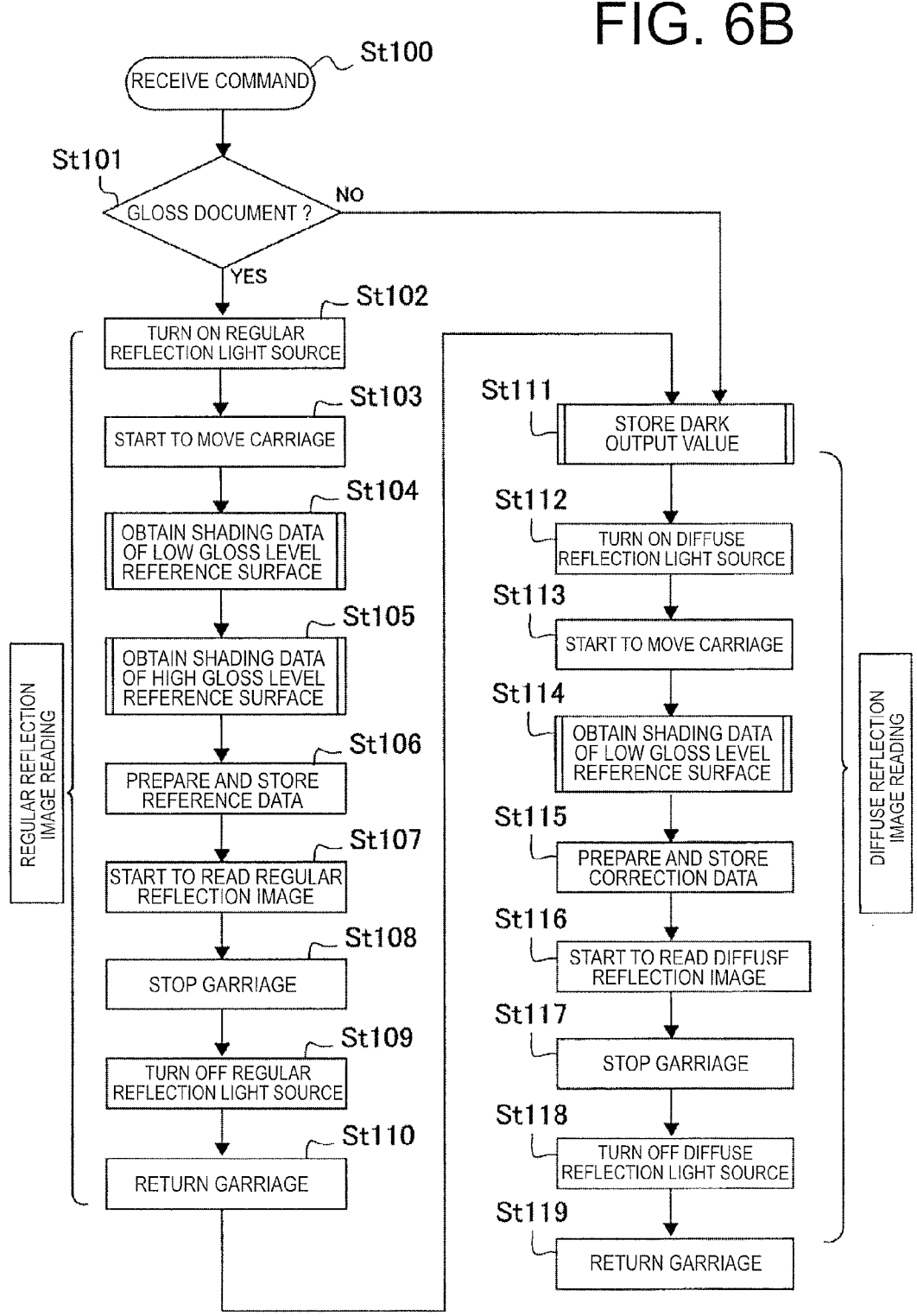
[FIG. 6B] is a flowchart showing an executing procedure of an image reading operation according to the present invention (second embodiment).

Next, the executing procedure of the image reading operation (second embodiment) will be explained with reference to FIG. 6B. To this end, the control CPU 30 receives an input signal from the control panel 37 or a command signal from a not shown image handling apparatus such as a computer. These input signal and the command signal are image reading conditions (color or monochrome, resolution, magnification factor, etc) and a setting signal of the reading mode for the "gloss image reading" or the "non-gloss image reading" (St100). In this case, when the "gloss image reading" is selected, a condition of finishing as to whether it is "concentration priority finishing" or "gloss priority finishing" is received simultaneously.

In the above reading condition, when the "gloss image reading" is selected (when "YES" at St101), the process transits to the following operation, and when the "non-gloss image reading" is selected (when "NO" at St101), the later described steps St111-St119 are executed.

When the "gloss image reading" mode is carried out, the second light source (regular reflection light source) 9b is turned on (St102) and the carriage 6 is moved to the position of the low gloss level reference surface 34 (St103). Then, at this position, the output value So2 of the low gloss level reference surface 34 is obtained from the photoelectric sensor 8 (St104). Next, the carriage 6 is moved to the high gloss level reference surface 33 to obtain the output value So1 of the high gloss level reference surface 33 (St105).

The thus obtained maximum gloss output value So1 and the minimum gloss output value So2, and the dark output value So4 (obtained and stored at the later described step St111) of the photoelectric sensor 8 already obtained and stored in the RAM 32 are used to prepare the previously described first correction data and the second correction data and store them in the storing means (RAM) 32. Along with this, the determining threshold set with reference to the minimum gloss output value So2 is stored in the RAM 32 (St106).

Next, in a state where the second light source (regular reflection light source) 9b is turned on, the control CPU 30 reads the document image Ga on the flat-bed type platen 2 (St107). This data obtained by the regular reflection reading is stored in the buffer memory 35, digitized by the above-described amplifier 20 and the A/D converting portion 21, and shading correction and color correction are performed by an image data correcting portion 38 in parallel with the image reading. And the corrected output value Sy is compared with the determining threshold and is stored in the first memory 35a.

In this regular reflection reading (St107), when the reading of the whole of the document image is finished, the control CPU 30 stops the carriage 6 (St108), and turns off the second light source 9b (St109). Along with this, the carriage 6 is returned back to the reading start position (St110). During this returning back process, the output value of the photoelectric sensor 8 is obtained and is stored as the dark output value So4 in the RAM 32 (Still).

Next, the control CPU 30 turns on the first light source (diffuse reflection light source) 9a (St112), and moves the carriage 6 to the reading position of the low gloss level reference surface 34 (St113). Then, from the output value of the low gloss level reference surface 34, the white level output value So3 is obtained (St114). This data generates the shading correction data in the similar way as mentioned before, which is stored in the memory table of the storing means (RAM) 32 (St115).

Next, the control CPU 30 moves the carriage 6 to the read starting position to execute the diffuse reflection reading (St116). This obtained data is digitized by the amplifier 20 and the A/D converting portion 21 in the same way as previously described; is subjected to shading correction and color correction by the image data correcting portion 38; and then is stored it in the second memory 35*b*.

After this, the control CPU 30 stops the carriage 6 (St117) and turns off the first light source 9*a* (St118). Then, the carriage 6 is returned back to the initial position (home position) (St119).

Figure 7:
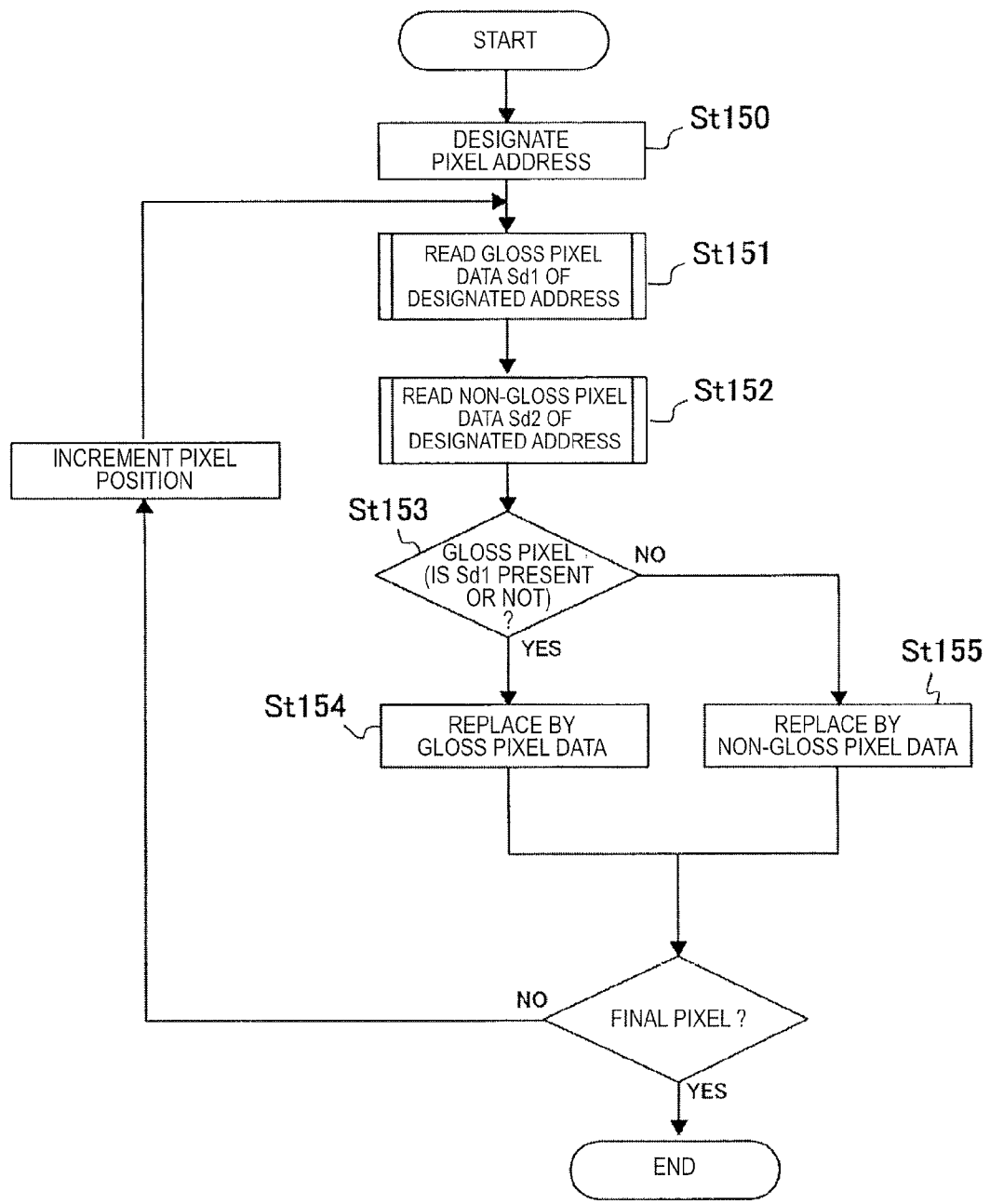
[FIG. 7] is a flowchart showing an image data obtaining method according to the present invention.

Next, obtaining the image data will be explained with reference to FIG. 7. The pixel data stored in the first memory 35*a* of the buffer memory 35 by the above-described regular reflection reading is compared with the determining threshold and the higher gloss level pixel is stored as the gloss pixel data Sd1. Also, the pixel data stored in the second memory 35*b* of the buffer memory 35 by the above-described diffuse reflection reading is subjected to data correction to be non-gloss data and is determined as non-gloss pixel data Sd2.

Then, the control CPU 30 designates a pixel of the photoelectric sensor 8 (St150). This pixel designation is performed by for example sequentially. And the gloss pixel data Sd1 is read from the first memory 35*a* (St151), and simultaneously the non-gloss pixel data Sd2 is read from the second memory 35*b* (St151). At this time, if the designated pixel is the gloss pixel data Sd1 (if "YES" at St153), the non-gloss pixel data Sd2 is replaced by the gloss-pixel data Sd1 (St154). Then when the designated pixel is not the gloss pixel data Sd1 (if "NO" at step St153), the non-gloss pixel data Sd2 is stored as the pixel data in a transfer buffer (St155).

Figure 8:
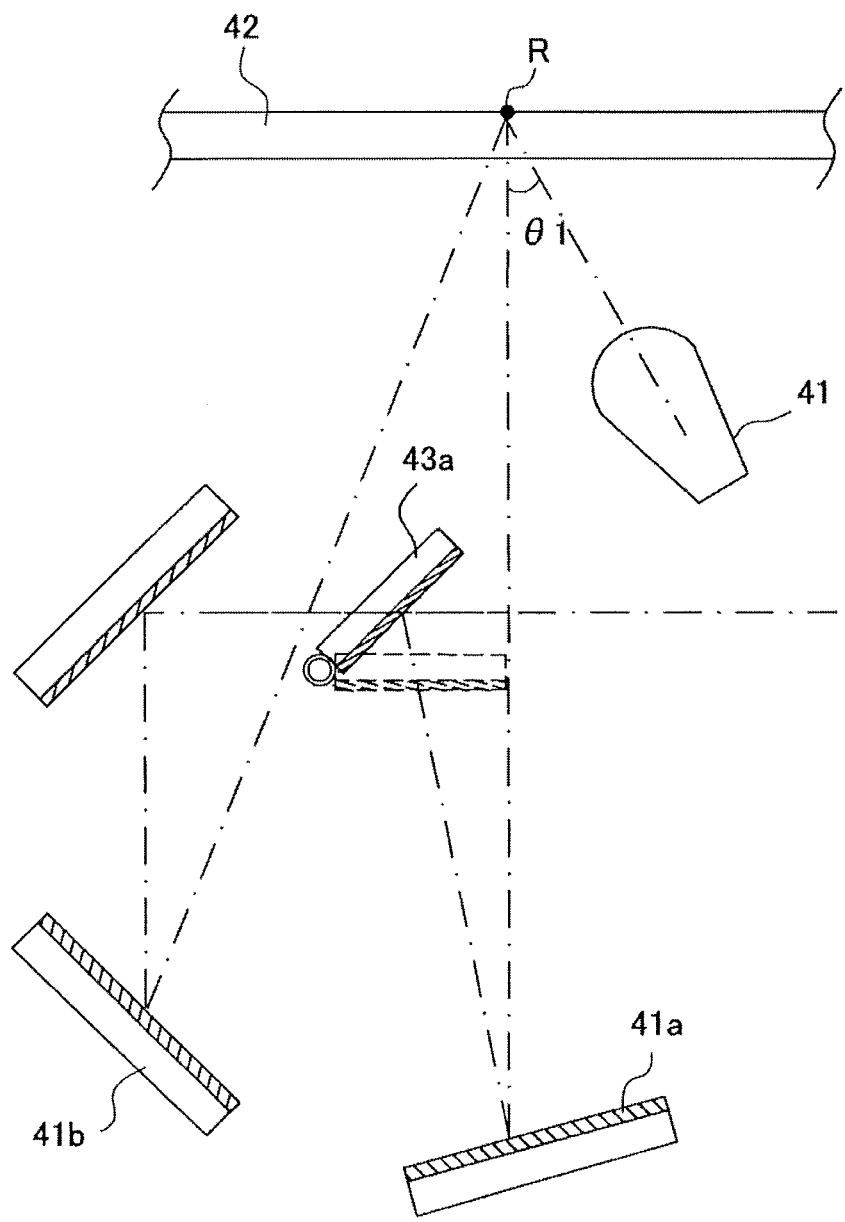
[FIG. 8] is an explanatory diagram of a constitution of a light source different from the apparatus shown in FIG. 1.

Note that, in the present invention, the first light source (diffuse reflection light source) 9*a* and the second light source (regular reflection light source) 9*b* are configured to be separately different two light emitting bodies (the illustrated ones are LED emitting bodies), however, as shown in FIG. 8, it is possible to configure by a single light emitting body 41 and may be configured by a first light source 41*a* for irradiating light from the light emitting body to a platen 42 at an angle θ1, and a second light source 41*b* for irradiating at an angle θ2.

In this case, for example, a shift means (for example an electromagnetic solenoid) is provided to shift a first reflecting mirror 43*a* to an angle position for guiding the diffuse reflection light from the first light source 41*a* to the photoelectric sensor (solid lines as illustrated), and to shift it to an angle position for guiding the regular reflection light from the second light source 41*b* to the photoelectric sensor (dashed lines as illustrated).

Further, in the present invention, the embodiments are shown in which the high gloss level reference surface 33 and the low gloss level reference surface 34 are respectively provided with reference plates on the flat-bed type platen 2, and at the start of the image reading, or at the time of calibration, the image reading is carried out, however, they are the embodiments when the light source lamps, the photoelectric sensor or the like changeover time. If the changes over time of the light source lamps, the photoelectric sensor or the like are similar in the main scanning and the sub scanning, it is of course not necessary to arrange the high gloss level reference surface and the low gloss level reference surface on the platen, and for example, the maximum gloss output value and the minimum gloss level output value may be previously set as experimental values, and the set values may be stored in the RAM.

The invention claimed is:

1. An image reading apparatus for reading document images having different gloss levels, comprising:
   a platen setting a document image;
   a regular reflection light source for photoelectric conversion of substantially regular reflection light from the document image;
   a diffuse light source for photoelectric conversion of substantially diffuse reflection light from the document image;
   a photoelectric conversion means photoelectrically converting reflection light from the document image on the platen;
   a control means executing regular reflection reading of the document image irradiated with light from the regular reflection light source, and diffuse reflection reading of the document image irradiated with light from the diffuse light source; and
   a data processing means generating image data based on each output value of regular reflection and diffuse reflection from the photoelectric conversion means; wherein
   the data processing means obtains, based on:
   a regular reflection correction value for correcting a regular reflection output value from the photoelectric conversion means;
   a diffuse correction value for correcting a diffuse reflection output value from the photoelectric conversion means; and
   a determining threshold for determining whether or not the regular reflection output value is a gloss pixel;
   gloss pixel data based on the regular reflection correction value after comparing the regular reflection output value from the document image with the determining threshold; and
   non-gloss pixel data based on the diffuse correction value for the diffuse reflection output value of the document image.

2. The image reading apparatus as claimed in claim 1, wherein the data processing means:
   sets the regular reflection correction value from the output value of the photoelectric conversion means when light is irradiated from the regular reflection light source to a high gloss level reference surface;
   sets the diffuse correction value from the output value of the photoelectric conversion means when light is irradiated from the diffuse reflection light source to a low gloss level reference surface; and
   sets the determining threshold from the output value of the photoelectric conversion means when light is irradiated from the regular reflection light source to the low gloss level reference surface; and
   the image reading apparatus comprises a storing means storing the regular reflection correction value, the diffuse correction value and the determining threshold.

3. The image reading apparatus as claimed in claim 2 wherein the platen is provided with:
   a high gloss level reference plate having a predetermined gloss level; and
   a low gloss level reference plate having a predetermined low gloss level:
   the control means:
   obtaining, in a state where the regular reflection light source is turned on, the regular reflection correction value from the high gloss level reference plate, and the determining threshold from the low gloss level reference plate; and obtaining, in a state where the diffuse light source or regular reflection light source is turned on, the diffuse correction value from the low gloss level reference plate;

the regular reflection correction value, the determining threshold, and the diffuse correction value thus obtained being stored in the storing means.

4. The image reading apparatus as claimed in claim 3 wherein the control means further:

obtains an output value of the photoelectric conversion means in a state where both of the regular reflection light source and the diffuse reflection light source are turned off; and stores the output value as a dark correction output value in the storing means.

5. The image reading apparatus as claimed in claim 1 wherein the data processing means:

generates, when the regular reflection output value is larger than the determining threshold, image data of the gloss pixel from the output value; and generates the image data except the gloss pixel, from the diffuse reflection output value.

6. The image reading apparatus as claimed in claim 5 wherein the data processing means:

makes image data of the gloss pixel to be a correction output value of the regular reflection output value larger than the determining threshold;

makes image data except the gloss pixel to be a correction output value of the diffuse reflection output value; and combines the image data of the gloss pixel and the image data except the gloss pixel.

7. The image reading apparatus as claimed in claim 5 wherein the data processing means:

makes the image data of the gloss pixel to be a calculated value obtained by calculating with a predetermined ratio between both correction output values which are a correction output value of the regular reflection output value larger than the determining threshold and a correction output value of the diffuse reflection at the same pixel;

makes the image data except the gloss pixel to be a correction output value of the diffuse reflection output value; and combines the image data of the gloss pixel and the image data except the gloss pixel.

8. The image reading apparatus as claimed in claim 1 wherein, with respect to the regular reflection light source and the diffuse light source, an irradiating angle of the regular reflection light source to an image reading position of the platen is set to be smaller than an irradiating angle of the diffuse light source.

9. The image reading apparatus as claimed in claim 8 wherein the regular reflecting light source and the diffuse light source are configured by a different plurality of light emitting bodies or a single light emitting body and a shifting means changing an irradiating angle position of the light emitting body to the light emitting body.

10. An image reading apparatus for reading document images having different gloss levels or a document image having different gloss level regions in the same document, comprising:

a platen setting a document image;

a regular reflection light source for photoelectric conversion of substantially regular reflection light from an the document image;

a diffuse light source for photoelectric conversion of substantially diffuse reflection light from the document image;

a photoelectric conversion means photoelectrically converting the reflection light from the document image on the platen;

a control means executing regular reflection reading of the document image irradiated with light from the regular reflection light source, and diffuse reflection reading of the document image irradiated with light from the diffuse light source; and an output value correcting means correcting each output value of a regular reflection and a diffuse reflection from the photoelectric conversion means to be values suitable for reading;

the output value correcting means is provided with a correction value generating means generating:

a maximum output reference value set from the output value of the photoelectric conversion means irradiated with light from the regular reflection light source to a high gloss level reference surface;

a first minimum output reference value set from the output value of the photoelectric conversion means irradiated with light from the regular reflection light source to a low gloss level reference surface;

a second minimum output reference value set from a dark output value of the photoelectric conversion means; and a first correction data based on the first minimum output reference value and the maximum output reference value, and a second correction data based on the second minimum output reference value and the maximum output reference value:

the control means being configured in such a way that, during executing the regular reflection reading of the document image, it is possible to select to correct by the first correction data or to correct by the second correction data.

11. The image reading apparatus as claimed in claim 10 wherein the correction by the correction value generating means is a shading correction, or an offset correction.

12. The image reading apparatus as claimed in claim 10 wherein the dark output value of the photoelectric conversion means is an output value of the photoelectric conversion means in a state where the regular reflection light source and the diffuse light source are both turned off.

13. The image reading apparatus as claimed in claim 10 wherein the correction value generating means generates the first correction data and the second correction data as normalized data having predetermined gradations.

14. The image reading apparatus as claimed in claim 10 wherein the control means is;

configured in such a way to set a determining threshold for determining whether or not the light from the regular reflection light source is a gloss pixel based on the output value of the photoelectric conversion means irradiated with light from the regular reflection light source; and comprised of a data processing means generating image data based on each output value of a regular reflection and a diffuse reflection from the photoelectric conversion means;

the data processing means;

obtaining gloss pixel data by comparing a regular reflection output value from the photoelectric conversion means and the determining threshold; and obtaining non-gloss pixel data from a diffuse reflection output value of the document image.

15. The image reading apparatus as claimed in claim 10 wherein the platen is provided with;

a high gloss level reference plate having a predetermined high gloss level; and a low gloss level reference plate having a predetermined low gloss level;

the control means:

obtaining the maximum output reference value and the first minimum output reference value from the output values of the photoelectric conversion means from the high gloss level reference plate and the low gloss level reference plate respectively, in a state where the regular reflection light source is turned on; and obtaining the second minimum output reference value from the output value of the photoelectric conversion means in a state where the diffuse light source and the regular reflection light source are both turned off, or from the output value prepared in a photoelectric conversion element; and storing the obtained maximum output reference value, the first minimum output reference value, and the second minimum output reference value in a storing means.

16. The image reading apparatus as claimed in claim 10 wherein the control means sets a gain value of an amplifier when the output value of the photoelectric conversion means is amplified during executing the regular reflection reading of the document image.

17. The image reading apparatus as claimed in claim 10 wherein the regular reflection light source and the diffuse light source are configured in such a way that an irradiating angle of the regular reflection light source to the an image reading position of the platen is set to be smaller than an irradiating angle of the diffuse light source.

18. The image reading apparatus as claimed in claim 17 wherein the regular reflection light source and diffuse light source are configured of different plurality of light emitting bodies, or are configured of a single light emitting body and a shift means changing the light path of the light from the light emitting body to the photoelectric conversion means.

* * * * *